(12) United States Patent
Colavito et al.

(10) Patent No.: US 6,926,851 B2
(45) Date of Patent: Aug. 9, 2005

(54) METHOD, COMPOSITION AND APPARATUS FOR CONTROLLED CONCRETE

(75) Inventors: Dominick Michael Colavito, Bangor, PA (US); Joseph Michael Schmidt, Saylorsburg, PA (US); Michael Joseph Buscarini, Waterdown (CA); James Charles Peter Rosso, Waterdown (CA); Ronald Warren Schmidt, Macungie, PA (US); Richard Charles Griffin, Mount Bethel, PA (US)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 328 days.

(21) Appl. No.: 10/007,851

(22) Filed: Oct. 31, 2001

(65) Prior Publication Data

US 2003/0091672 A1 May 15, 2003

(51) Int. Cl.$^7$ .................................................. E04B 1/16
(52) U.S. Cl. ....................... 264/33; 264/35; 264/166; 264/212; 264/213; 425/63; 249/20
(58) Field of Search .......................... 264/33, 35, 333, 264/69, 70, 166, 212, 213; 425/63; 249/20

(56) References Cited

U.S. PATENT DOCUMENTS

| | | | | |
|---|---|---|---|---|
| 3,497,579 A | * | 2/1970 | Barron | 264/33 |
| 3,878,278 A | * | 4/1975 | Miller et al. | 264/45.3 |
| 3,892,895 A | * | 7/1975 | Toogoo et al. | 427/393.5 |
| 4,171,984 A | | 10/1979 | Hosaka et al. | |
| 4,726,570 A | | 2/1988 | Phillips et al. | |
| 4,797,161 A | * | 1/1989 | Kirchmayr et al. | 106/726 |
| 5,533,888 A | * | 7/1996 | Belarde | 425/64 |
| 5,558,823 A | * | 9/1996 | Gray | 264/33 |
| 5,958,312 A | | 9/1999 | Stripp et al. | |

FOREIGN PATENT DOCUMENTS

| | | |
|---|---|---|
| JP | 10-281655 | 10/1998 |
| JP | 11-240770 | 9/1999 |

OTHER PUBLICATIONS

Product description Duraset 1060, 1065, 1070; website: http://www.ucscurethane.com/coa_dur.htm.*
CCI Concrete Coating Inc., Duraset Material Safety Data Sheet, Aug. 1, 2000. pp. 1–3.
Product Description Duraset 1060, 1065, 1070.
UNIFRAX, Material Safety Data Sheet, Aug. 25, 2004. p. 1 of 10.

* cited by examiner

*Primary Examiner*—Chris Fiorilla
*Assistant Examiner*—Michelle Acevedo Lazor
(74) *Attorney, Agent, or Firm*—Michael J. Herman

(57) ABSTRACT

A method is provided for use of a concrete composition and an associated apparatus. The method provides for mixing of the concrete material, accelerant powder and, optionally, an associated substance to enable the controlled hardening of the concrete material in a monolithic structure. The apparatus can dispose a slip-plane film to facilitate a relatively continuous process.

11 Claims, 2 Drawing Sheets

METHOD, COMPOSITION AND APPARATUS FOR CONTROLLED CONCRETE

FIELD OF THE INVENTION

Figure 1:
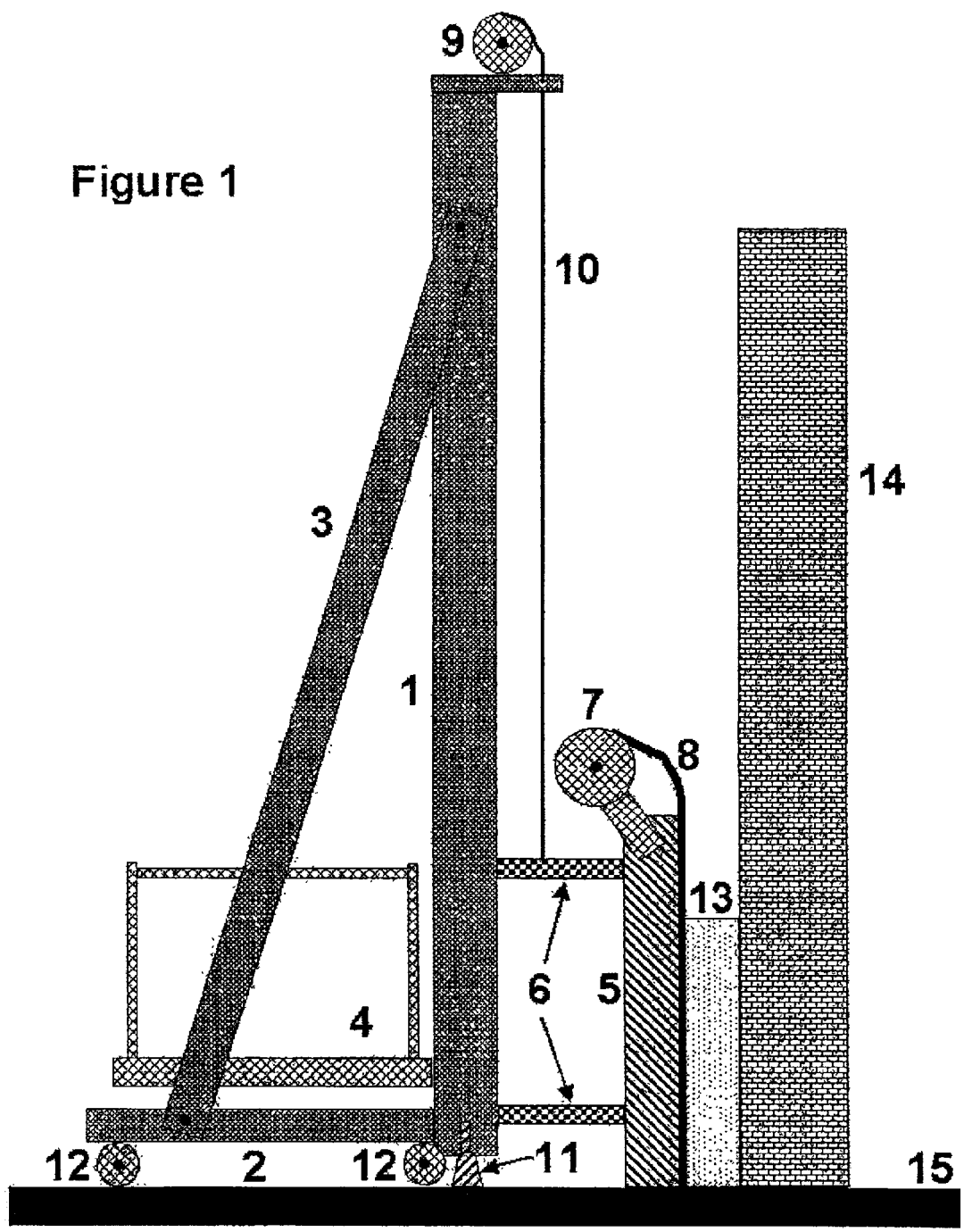

This invention relates to concrete materials and the use and apparatus for the use of such materials. More particularly, the present invention relates to material that can in one instance be used as common concrete material and in another instance can be used as refractory concrete material.

Concrete materials have a variety of uses, including use as concrete in civil engineering applications and as refractory material, such as in the steel production industry.

BACKGROUND OF THE INVENTION

Concrete materials can be applied by methods of mixing a batch of moldable concrete material, transporting the material (conveyor belts, buckets, hoppers, pumps, and the like), and then spreading such material into forms for setting into a hardened state. Typically, such concrete materials are worked in the forms before the material hardening reaction sets the material in place and becomes no longer pliable. Because the length of time in the hardening can represent dead time in which further work cannot progress until hardening occurs, additives may be added to the concrete material which will accelerate the rate of hardening. However, such additives cannot be so effective that hardening occurs in the application equipment or before completion of the working process to ensure homogeneity in the formed hardened structure. Accordingly, the use of accelerants cannot include accelerants which work too rapidly.

Concrete materials can be applied by either casting or projecting the refractory into place by dry application processes and wet application processes, such as by the "gunnite" and the "shotcrete" processes respectively, to provide a rapid formless application of a refractory. Field performance of gunnited or shotcreted refractory products can be good, but field installations are often affected by the problems of the existing technology which have very limited control of the smoothness and of the thickness of the application. To overcome these problems and achieve both the desired smooth finish and the controlled thickness, the refractory product applied by casting requires custom forms and may have issues with setting or curing times. Often, such setting processes require segmental casting and hardening such that seams are present in the refractory monolith, that is, the finished product is not a true monolithic form but has discontinuities which can be sources of performance problems.

What is needed is a concrete material, method and apparatus of application of such material to enable the continuous forming of a true monolithic structure with controlled dimensions. An objective of the present invention is a concrete material with a controlled hardening rate which can be used to form a continuous monolithic structure having controlled dimensions. Another objective of the present invention is to provide an apparatus capable of applying such material in order to form a seamless monolith without disruption of the surface of the structure and in a manner which can take advantage of the controlled hardening of the material. A further objective of the present invention is a method of using such material and such apparatus, separately or together. These and other objectives are provided herein.

RELATED ART

In U.S. Pat. No. 4,726,570 a system is provided for casting in a ladle using locking means to hold a mandrel and associated members in the ladle against the buoyant force of a castable refractory used in lining the ladle. When the castable refractory for solidified, the associated locking mechanism which locks the entire assembly to trunnions is released, and the entire assembly is lifted from the ladle by use of suitable lifting equipment attached to a lifting eye.

In U.S. Pat. No. 5,958,312 a process is disclosed for the partial reconstruction of the refractory lining in the upper zone of the wall area of a ladle as well as a device for performance of the process. The process used a castable refractory with an inflating sealing body.

In Japanese Application Number 10-064419, there is disclosed a refractory blend with sodium polyacrylate for wet blasting construction. A liquid specific silicate is used as an accelerating agent.

In Japanese Application Number 09-097895, there is disclosed a nozzle, and method of use, for mixing a monolithic refractory material and a hardening accelerator before executing the monolithic refractory to the inside surface of a molten metal container.

SUMMARY OF THE INVENTION

In one aspect of the present invention is a method for forming a concrete structure using an advantageous method of mixing a concrete material and an accelerant composition. One advantage of the invention is the critical control of the concrete hardening so that a monolithic structure can be made. Further control can be obtained by the association or inclusion of selected optional materials.

In another aspect, the present invention is an apparatus for performing the inventive method. One element of such apparatus is the advantageous providing of a film as a slip-plane between the concrete material and the apparatus so that a monolithic structure is obtained with controlled surface tolerances.

In yet another aspect, the invention is a novel mixture composition of a concrete material and an accelerant composition. An optional substance can be associated for further control of the hardening process.

DESCRIPTIONS OF THE FIGURES

In FIG. 1 there is depicted an apparatus embodied by the present invention in an initial step of the construction process of a monolithic ladle lining.

Figure 2:
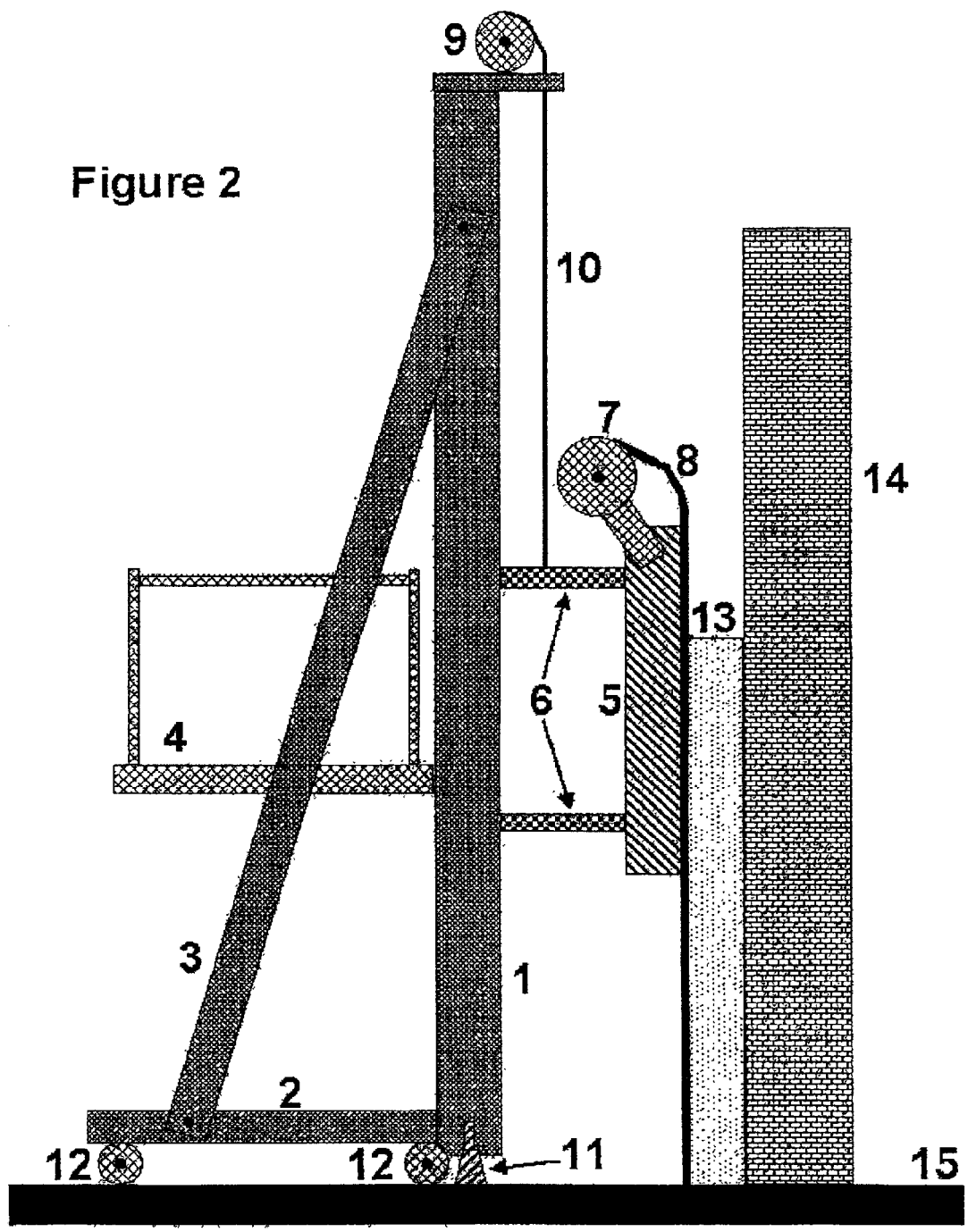

In FIG. 2 there is depicted the same apparatus in a subsequent step of the construction process.

In FIGS. 1 and 2 there is depicted use of an apparatus consistent with the present invention. In FIG. 1 there is depicted one embodiment of the present invention in which construction of a monolithic lining for a steel ladle is being performed. Depicted is an apparatus containing upright support beam 1, horizontal support base 2, and angle brace 3. These members are rigidly fixed and moved on casters 12 and anchored with positioning jack 11. Moving platform 4, provides a base for an operator of the apparatus to stand. The operator positions adjustable slip-form braces 6, which are perpendicularly attached to slip-form 5. The slip-form 5, can then be moved by unrolling or wiling hoist cable 10 through the power hoist motor 9. The operator controls such movement. Slip-form 5 is positioned at a desired distance from the existing wall 14 and is set on existing floor 15. Concrete 13 is placed into the space between wall 14 and slip-form 5. Film dispensing roll 17 dispenses polymer film 8 into position between concrete 13 and slip-form 5. The interface between slip-form 5 and polymer film 8 provides a slip-plane so that slip-form 5 can be repositioned once concrete 13 has become sufficiently stable to maintain structural integrity. FIG. 2 depicts the elevation of slip-form 5 up the wall to enable the placement of additional concrete 13 to monolithically form with the previously placed concrete 13 as depicted in FIG. 1.

DETAILED DESCRIPTION OF THE INVENTION

One embodiment of the present invention is a method for installing a concrete composition. This embodied process has the following:

admixing (a) a first composition comprising a concrete composition, and (b) a second composition comprising an accelerant composition to form a castable or projectable admixture;

casting or projecting the admixture into a space between a base structure and a moveable form having a surface area in an adjacent position relative to the base structure;

enabling the admixture to set to form a structure with a free structure surface; and, moving the form to a different adjacent position.

This above process is effectively repeated to form a monolithic structure section having a surface area larger than the surface area of the moveable form. A monolithic structure section is one in which the different structure sections formed between the form and the base structure are connected with a continuous structure. That is, no seams or other line of discontinuity are present so as to result in a difference in performance. For instance, in an application in which the base structure is a refractory vessel, the monolithic structure can be a ladle wall having a free surface which is exposed to molten metal during use of the vessel. The monolithic form of the wall results in there not being a seam or other discontinuity which enables molten metal to reach the vessel's outer metal wall in a manner which threatens a melt-down of the vessel.

The inventive process enables the practitioner to have the option to produce a monolithic structure having a variability of thickness of less than about 10 millimeters, preferable less than about 5 millimeters.

The accelerant composition useable in the present invention is the dry form of preferably one of the known accelerants used in the concrete art. A preferred form of the accelerant composition is a powder. Also, the present invention affords the option of using known accelerants in a form, which enables use of such accelerants which was not heretofore possible for the present applications. For instance, some known accelerants in a liquid state are too fast acting for use in the present applications. However, when used in a solid state, such as a powder, such material can now be used through use of the present inventive method. Such accelerating agents typically are believed to function by causing thickening or gelling, such as that resulting from flocculation associated with a rise in the pH of the composition. Such accelerating agents can also function by firming or hard-setting the concrete bond, that is, causing the onset of the bond phase of the system in which rigidity and load-bearing characteristics arise. In the present process the accelerant powder can be mixed with the concrete composition when the concrete composition is being transported from a holding state to being delivered to the site of use, such as in a concrete or refractory form. This can also be done with an intermediate, short-term holding step before delivery to the site of use. A preferred method of delivery is termed the "shotcreteing" method. In this method the concrete composition is delivered under pressure, such as by air or water pressure, through a nozzle to a surface for deposit. Advantageously, the accelerant is transported into the nozzle for mixing with the concrete composition prior to its projection from the nozzle. Such mixing may alternatively be provided by auger action.

Preferably, the process uses a second composition having the accelerant effectively in association with a carrier to control dispersion and/or transportation of the accelerant. Such carrier can be a powder, a liquid or a melt. The associated substance can optionally be present as a coating on the accelerant powder. Preferably, such coatings can include fatty acids, or other soluble encapsulation compositions.

Preferably, the carrier is a liquid and, more preferably, an organic liquid composition. Non-limiting examples of carrier substances are glycols. Preferred organic liquids are ethylene glycols, propylene glycols, or other glycols which are liquid at room temperatures; oils, such as mineral or synthetic oils; or other suitable liquids having viscosities and flash-points suitable for the present uses.

Preferably, the second composition further comprises a carrier differing from the coating on the accelerant powder. The carrier comprises one or more of a substance selected from a group consisting of a powder, a liquid and a melt. The carrier works best when it is miscible in water.

The term concrete composition contemplates one or many of calcium aluminum or equivalent systems of inorganic materials used in engineering materials which harden to perform useful functions of strength and load-bearing. Preferably, the concrete composition contains one or more cement(s) selected from the group consisting of a calcium aluminate cement, calcium silicate cement, a silicate bonded cement, a chlorine-bonded cement, a colloidal silica binder cement and a colloidal alumina binder cement. In a preferred process, the concrete composition is a refractory composition.

Preferably, the accelerant composition is from about 0.05 to about 5 weight percent of the total weight of projectable admixture, more preferably from about 0.1 to about 1 weight percent of the total weight of projectable admixture.

In another embodiment, the process uses an accelerant composition which comprises both a flocculating agent and a setting agent. More preferably, the process further comprises adjusting the proportion of the flocculating agent and the setting agent to effectively control the action of the accelerant powder to enable the projectable composition to temporarily flow. This adjustment can be from job to job or during the course of a particular job as the conditions warrant.

In yet another embodiment, the process is used to construct a non-horizontal structure. For example, one use can be to construct a vessel wall lining in a refractory vessel. In such an application a form is provided adjacent to a vertical wall. Such form is parallel to the internal surface of the vessel and serves to hold a concrete composition in place until such composition sufficiently sets or firms to be able to stand in place after removal of the form. Preferably, the process further comprises supplying a slip-plane between the concrete composition and the moveable form to enable the moving of the form to a different adjacent position so that the free wall surface maintains integrity. The form can be moved up the wall, after starting the process at a lower or bottom position of the vessel. In this use the process forms a wall section from bottom to top of the vessel in one monolithic form since the form is moved once a sufficient amount of the refractory material in the lower portion of the mold firms and additional refractory material is supplied to fill the then vacant space between wall and form above the material. This material bonds monolithically with the existing material in the mold as the existing material in the upper portion of the mold is still in a moldable state so as to be practically seamless. Optionally, the form could be moved laterally, horizontal to the vessel bottom.

Preferably, the process uses an apparatus which disposes a film or equivalent barrier between the refractory material and the form. This serves to provide a "slip-plane" function which prevents frictional interaction between the form surface and the setting surface of the refractory, thereby avoiding erosion or abrasion of the refractory surface and disrupting the refractory surface. Optionally, the process uses a slip-plane which comprises one or more materials selected from a plastic, a rubber, a metallic foil, a paper and a screen. Preferably, the matrix is a latex or polymer composition, such as, for example, a polyethylene, polypropylene, or polyester film.

Similarly, in an application in which the formed structure is a horizontal monolithic structure with a free top surface, the embodied process has the following:

admixing (a) a first composition comprising a concrete composition, and (b) a second composition comprising an accelerant, preferably a powder, to form a castable or projectable admixture;

casting or projecting the admixture into a space between a base structure and a moveable form having a surface area in an adjacent position relative to the base structure;

enabling the admixture to set form a structure with a free structure surface; and, working the admixture to form a monolithic structure having a variability of thickness of a desired thickness.

In performing the invention, one selects a carrier which will enable the dispersion of the accelerant composition and will enable a rate of dissolution of the accelerant to effect the subsequent rate of hardening. That is, one may balance the dispersion characteristics of the liquid and any attenuation or other impact of the liquid on the dissolution rate on the accelerant. For example, upon admixing the concrete composition and the accelerant composition, which is a mixture of accelerant powder and carrier, the accelerant powder, being initially undissolved, dissolves at a predetermined rate based upon particle size, accelerant powder coating, or carrier liquid. Accordingly, in a preferred embodiment, after creation of the admixture, the initial hardening reaction is not occurring or is occurring but at a relatively slower rate than with the presence of a pre-dissolved accelerant. After a period of time, the rate accelerates as the accelerant dissolves and the concrete material commences to interact. The reaction continues to create a flocculation or setting.

In a preferred embodiment the moldable composition is a pumpable composition. The pumpable composition comprises an admixture of a first composition containing a concrete composition. This composition can be flowed through a pumping apparatus in which air or water, which provides a projecting force, and an accelerant composition containing an accelerant powder and optional substance(s) are mixed prior to projection through the nozzle to the surface upon which the material is to be molded. Preferably, the optional substance includes an organic liquid. The delayed reaction caused by the accelerant powder's dissolution permits the initial forming as by, for example, blades or vibrators, prior to any significant commencement of the hardening reaction under acceleration due to the presence of the accelerant. Preferably such timing permits the continuous formation of a monolithic form by fast incremental movement or by continuous movement of the application apparatus.

The method of the present invention allows the pumpable material to flow into a slip-form cavity and take the shape of the cavity prior to achieving a set. The delayed reaction between the concrete material and the accelerant subsequently achieves a fast set which allows rapid movement of the slip-form. The set material that is exposed as the slip-form is moved retains both a smooth surface and the substantially-exact dimensions of the slip-form. The set material can support weight immediately thus eliminating the need for a custom, application specific form, to achieve both smoothness and thickness control. Unlike the prior art in which only the use of custom forms for casting could achieve both the smoothness and dimensional tolerances, the present invention eliminates such restrictive practices. In prior methods, when casting, the material is entirely fluid in the mold which creates a requirement of a mold or form of great strength. In accordance with the present invention the new process requires only a relatively smaller amount of material to be fluid at any one time, there by enabling use of a lighter and simpler forming structure. In addition, conventional casting typically requires an extended cure time in the mold (excluding quick set materials), often as much as 24–48 hours to achieve an acceptable set before form removal. The present invention advantageously enables the elimination of extra cure time prior to mold removal after achieving the desired set.

The addition of the accelerant powder and carrier at the projection nozzle with this new method is an advantage over the use of a quick set castable. The new inventive composition can be held as a wet mix in hoppers or mixers for extended periods of time without fear of premature setting. Then, in accordance with the present invention, the material sets after it has been admixed with the accelerator soon after it enters the slip-form. This allows for far greater field flexibility on installation.

The accelerant powder of the present invention comprises one or more compound(s) selected from the known accelerant powders of the concrete or refractory arts, as well as accelerants not heretofore used in such applications. Preferably, the accelerant powder is selected from alkali compounds. Preferred alkali compounds are sodium, lithium or potassium compounds. Non-limiting examples include sodium silicate, sodium aluminate, lithium carbonate, lithium citrate, potassium silicate, potassium aluminate, potassium carbonate, sodium carbonate, and lithium hydroxide. Other known accelerants are also usable. Such accelerants include organic compounds, such as triethanolamine or sulfate compounds, as non-limiting examples. The physical properties of the accelerant powder can also be a consideration in the selection and use of the powder. Accordingly, in yet another preferred embodiment, the accelerant powder is characterized by having a particle size distribution which is effective to control the rate of dissolution and subsequent reaction. Complete dissolution is not necessary for effective reactions in all cases. Preferably, the particle size is small enough to suspend the powder in the carrier media, but large enough to control dissolution for the desired reaction rate.

The organic liquid can be any which is compatible with the other materials and the intended use. Preferably, the relative proportions of concrete material, accelerant powder and organic liquid are proportioned such that the moldable composition is moldable from about fifteen seconds to about 5 minutes. Such proportion enables the placement of the concrete material in a variety of field uses.

In a preferred refractory composition, the second composition comprises from about 30 to about 60 weight percent of accelerant powder and from about 40 to about 70 weight percent propylene glycol.

In yet another embodiment, the present invention is an apparatus comprising (a) a first application means for applying a moldable concrete composition to a base surface to produce a monolithic mass adhering to the base surface; (b) a forming means for slip-forming an outer surface of the monolithic mass at a distance from the base surface; (c) a second application means for applying a protective barrier between the monolithic mass and the forming means effective to maintain the integrity of the outer surface; (d) a structural means for positioning the first application means relative to the base surface effectively to produce the monolithic mass; and, (e) a control means for controlling the forming of the monolithic mass by effectively controlling positioning of the structural means so that the monolithic mass maintains integrity and adheres to the base surface. Preferably, the control means is exercised to maintain the dimensional tolerance desired. This embodiment can be used with known concrete compositions or the compositions of the present invention. In an alternative preferred embodiment the apparatus further comprises a mixing means for admixing a concrete composition and a concrete accelerant composition to produce the moldable concrete composition. Embodiments can further comprise a means for admixing pressurized air to provide the moldable concrete composition with sufficient energy to be projected through ambient air to the surface.

A preferred mixing apparatus for use with the present invention is a shotcreteing apparatus. Alternatively, a screw auger can be used to mix the materials and delivery of the material may be by transportation without projection.

The following examples are intended to exemplify the invention and, in no aspect whatsoever, limit it.

EXAMPLE 1

Castable Formulation

Samples of a castable formulation are produced using the following materials and amounts.

| Material | Sizing | Wt. percent |
| --- | --- | --- |
| White Fused Alumina | 0–5000 Microns | 60 |
| Alumina Magnesia Spinel | 0–700 Microns | 20 |
| Alumina Cement | | 5 |
| Calcined Alumina | | 15 |
| Dispersant | | As needed |

This formulation is mixed with water to achieve a static flow of 65 percent.

One sample (Sample A) of the castable formulation is mixed with 0.3 weight percent based on weight of the castable formulation of sodium silicate solution (44 percent solids by weight). This causes floccing to zero flow state within 15 seconds. This sample becomes too thick to flow into a mold.

Another sample (Sample B) of the castable formulation is mixed with 0.3 percent of an accelerator formulation containing 42 percent sodium silicate powder, 7 percent hydrated alumina powder, and 51 percent propylene glycol liquid. All percentages of the accelerator formulation are percents by weight. Sample B produces the following results:

| | |
| --- | --- |
| Initial Flow | Good Flow |
| Initial Floccing | 0:48 (minutes/seconds) |
| Initial Firming | 1:10 (minutes/seconds) |
| Final Set | 4:05 (minutes/seconds) |

"Good flow" means that the material still flows (as prior to accelerator addition).

"Final set" means that the material is not deformable to firm finger pressure.

EXAMPLE 2

A second Sample A is formulated as in Example 1. A different Sample B is formulated using an addition of 0.45 percent (by weight) of an accelerator containing 20 percent sodium silicate powder, 30 percent lithium carbonate powder, and 50 percent propylene glycol liquid. All percentages of the accelerator formulation are percents by weight. Sample B produces the following results:

| | |
| --- | --- |
| Initial Flow | Good Flow |
| Initial Floccing | 0:44 (minutes/seconds) |
| Initial Firming | 4:00 (minutes/seconds) |
| Final Set | 8:15 (minutes/seconds) |

A benefit of maintaining good flowability of Sample B of Examples 1 and 2 is that the materials can be readily molded following the addition of the accelerator to enable a uniform monolithic structure to be constructed.

We claim:

1. A process for installing a concrete composition, the process comprising:

providing a first composition comprising a concrete composition, and admixing the first composition with a second composition comprising an dispersed accelerant powder that is effectively in association with one or more of a carrier substance(s) selected from the group consisting of a powder, a liquid and a melt such that the one or more of the components controls the action of the accelerant composition to enable the projectable admixture to temporarily flow and wherein the accelerant powder is at a concentration of from about 0.05 percent to about 5.0 percent by weight total composition to form a projectable admixture;

projecting the admixture into a space between a base wall and a slip-plane wherein the slip-plane is between and adjacent to the projectable admixture and a moveable form having a surface area in an adjacent position relative to the base wall;

enabling the admixture to set to form a wall with a free wall surface; and, moving the form to a different adjacent position wherein the slip-plane can be immediately removed from the free wall surface or left in place for later removal; and, whereby the above process is repeated to form a monolithic wall section having a surface area larger than the surface area of the form.

2. The process of claim 1 wherein the carrier substance(s) is an organic liquid composition.

3. The process of claim 1 wherein the process is performed to provide a variability of thickness less than about ten millimeters.

4. The process of claim 1 wherein the carrier is miscible in water.

5. The process of claim 1 wherein the concrete composition comprises one or more cement(s) selected from the group consisting of a calcium aluminate cement, a silicate bonded cement, a chlorine-bonded cement, a colloidal silica binder cement, a calcium silicate cement, and a colloidal alumina binder cement.

6. The process of claim 1 wherein the accelerant powder is from about 0.1 to about 1 weight percent of the total weight of projectable admixture.

7. The process of claim 1 wherein the concrete composition is a refractory composition.

8. The process of claim 1 wherein the accelerant powder comprises a flocculating agent and a setting agent.

9. The process of claim 8 comprising adjusting the proportion of the flocculating agent and the setting agent to effectively control the action of the accelerant powder to enable the projectable admixture to temporarily flow.

10. The process of claim 1 wherein the slip-plane comprises one or more material selected from the group consisting of a plastic, a rubber, a metallic foil, a paper and a screen.

11. The process of claim 10 wherein the material is a latex or polymer composition.

* * * * *